(12) United States Patent
Iqbal et al.

(10) Patent No.: US 8,985,291 B2
(45) Date of Patent: Mar. 24, 2015

(54) DIFFERENTIAL UNIT WITH DAMPER SYSTEM

(71) Applicant: Ford Global Technologies, LLC, Dearborn, MI (US)

(72) Inventors: Javed Iqbal, Farmington Hills, MI (US); Amir E. Keyvanmanesh, West Bloomfield, MI (US); Yitzongn Chern, Troy, MI (US); Tony Ge, Northville, MI (US); Wan Joe Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/856,333

(22) Filed: Apr. 3, 2013

(65) Prior Publication Data

US 2014/0298655 A1 Oct. 9, 2014

(51) Int. Cl.
*F16D 13/04* (2006.01)
*F16D 3/12* (2006.01)

(52) U.S. Cl.
CPC .................. *F16D 3/12* (2013.01); *Y10T 464/40* (2013.01); *Y10T 29/49611* (2013.01); *Y10S 29/046* (2013.01)
USPC .......... 192/35; 29/DIG. 46; 73/468; 192/112; 475/267

(58) Field of Classification Search
USPC .................. 464/127, 180; 74/574.4; 180/381; 188/379, 380; 73/468; 29/DIG. 46; 475/267; 192/35, 112
See application file for complete search history.

(56) References Cited

U.S. PATENT DOCUMENTS

| | | | | |
|---|---|---|---|---|
| 2,477,081 A | * | 7/1949 | Peirce | 74/574.4 |
| 2,649,941 A | * | 8/1953 | Doebeli | 192/35 |
| 3,269,219 A | * | 8/1966 | Hart | 475/267 |
| 4,302,986 A | | 12/1981 | Shepherd | |
| 5,145,025 A | | 9/1992 | Damian | |
| 5,503,043 A | | 4/1996 | Olbrich | |
| 5,884,902 A | | 3/1999 | Hamada et al. | |
| 6,547,053 B2 | | 4/2003 | Shih | |
| 6,662,920 B2 | * | 12/2003 | Hofer et al. | 192/35 |
| 6,889,803 B2 | | 5/2005 | Schankin et al. | |
| 7,210,565 B2 | * | 5/2007 | Yamazaki et al. | 192/35 |
| 7,845,479 B2 | * | 12/2010 | Ochiai et al. | 192/35 |
| 8,117,943 B2 | | 2/2012 | Manzoor | |
| 8,136,621 B2 | | 3/2012 | Steyer et al. | |
| 8,327,985 B2 | | 12/2012 | Boyd et al. | |
| 2004/0149532 A1 | | 8/2004 | Beigang | |
| 2008/0115999 A1 | | 5/2008 | Patrascu et al. | |

FOREIGN PATENT DOCUMENTS

JP 6-94075 A * 4/1994 ............. 464/180

OTHER PUBLICATIONS

Leissa and Chern, Closed Form Exact Solutions for the Forced Vibrations of Rectangular Plates, Pan American Congress of Applied Mechanics, 1991, pp. 710-713.

(Continued)

*Primary Examiner* — Gregory Binda
(74) *Attorney, Agent, or Firm* — James Dottavio; MacMillan, Sobanski & Todd, LLC

(57) ABSTRACT

A vehicle differential unit (DU), including: a torsional damper assembly having a plurality of independently sprung damper assemblies positioned with respect to the DU, each damper assembly configured to reduce noise or vibration generated by the DU in a predetermined frequency range.

13 Claims, 4 Drawing Sheets

(56) References Cited

OTHER PUBLICATIONS

Leissa and Chern, Appropriate Analysis of the Forced Vibration Response of Plates, Journal of Vibration and Acoustics, vol. 114, 1992, pp. 106-111.

Chern, Y., Forced Vibration Analysis of Plates and Shallow Shells, Dissertation Ohio State University, 1989.

* cited by examiner

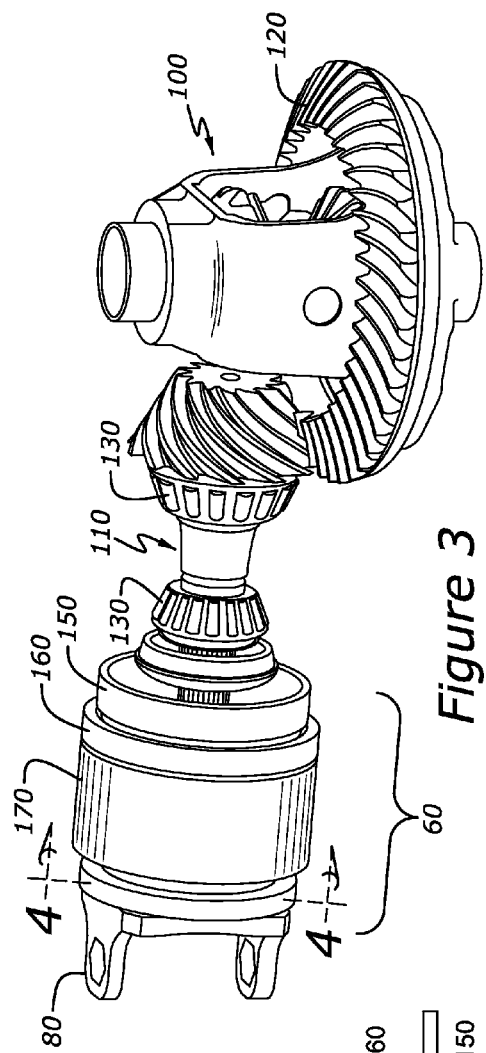
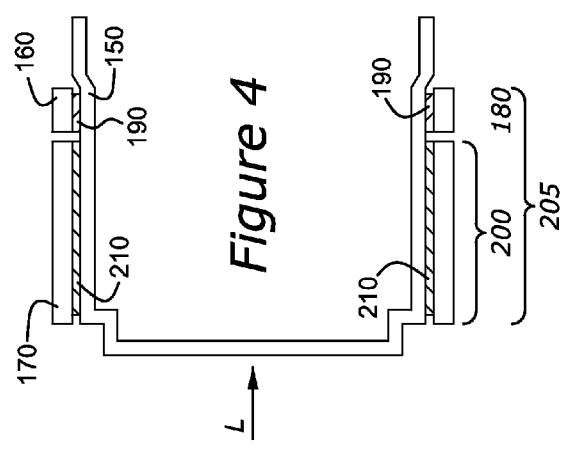
Figure 3
Figure 4

DIFFERENTIAL UNIT WITH DAMPER SYSTEM

TECHNICAL FIELD

The present disclosure relates to noise and vibration damping systems for vehicle drivelines, particularly differentials.

BACKGROUND

Modern vehicle drivelines can generate unwanted noise or vibration during operation. This can especially be true after extended use, thus noise and vibration mitigation is a common issue for the driveline. Driveline axle dampers are one solution. Such dampers can increase driver perception in terms of seat vibration, vehicle moaning and gear rattle. Vehicle noise and vibration measurements read in various ranges, e.g., below 150 Hertz (Hz), between 200 Hz and 400 Hz and also between 450 Hz and 1000 Hz. Vibrations at these frequencies can occur in a single vehicle; however, it is difficult to find a single damper of simple construction that has a resonance range encompassing the different frequency ranges at which the driveline can oscillate. Complex dampers capable of damping over a wide range are typically more costly to implement on a vehicle.

In the past, axle dampers were typically packaged at a pinion gear area. This area, however, has limited packaging space and requires heat shielding from parts proximate to the damper. Also because the pinion gear dimensions vary between types of vehicles, e.g., diesel/gas-engine vehicles, damper configurations often needed to be tailored for each vehicle type. It can be desirable to configure dampers along the same radius to save space. For example, U.S. Pat. No. 5,884,902 titled "Double-Mass Type Dynamic Damper Having Two Damper Systems" teaches a driveline with multiple dampers arranged radially with respect to each other. The performance of each damper can be compromised, however, with radially aligned dampers sprung with respect to each other.

Therefore, it is desirable to provide independently sprung dampers for driveline components capable of reducing noise or vibrations across a relatively wide range of frequencies, particularly for use in a differential unit.

SUMMARY

The present invention may address one or more of the above-mentioned issues. Other features and/or advantages may become apparent from the description which follows.

One advantage of the present disclosure is that it teaches a compact configuration with multiple independently sprung dampers. The damper assemblies can be universally used in different vehicles, i.e., both diesel and gas engines.

Certain embodiments of the present invention relate to a vehicle differential unit (DU), including: a torsional damper assembly having a plurality of independently sprung damper assemblies positioned with respect to the DU, each damper assembly configured to reduce noise or vibration generated by the DU in a predetermined frequency range.

Other embodiments of the present invention relate to a vehicle driveline assembly, having: a propshaft connected to a differential unit through a clutch carrier unit; a hub at least partially enclosing the clutch carrier unit; a first damper assembly positioned with respect to the hub and configured to dampen vibrations in a first frequency range; and a second damper assembly positioned with respect to the hub and configured to dampen vibrations in a second frequency range.

Other embodiments of the present invention relate to a method of manufacturing a vehicle differential unit, including: connecting a first damper assembly to the differential unit; and connecting a second damper assembly to the differential unit. The first damper assembly is configured to dampen vibrations in a first frequency range. The second damper assembly is configured to dampen vibrations in a second frequency range.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description for carrying out the invention when taken in connection with the accompanying drawings. In the figures:

BRIEF DESCRIPTION OF THE DRAWINGS

FIG. 3 is a perspective view of the rear differential unit and a clutch carrier unit from FIG. 2.

FIG. 4 is a partial cross-sectional view of the clutch carrier unit of FIG. 3 at line 4-4 with high and low frequency dampers.

Figure 1:
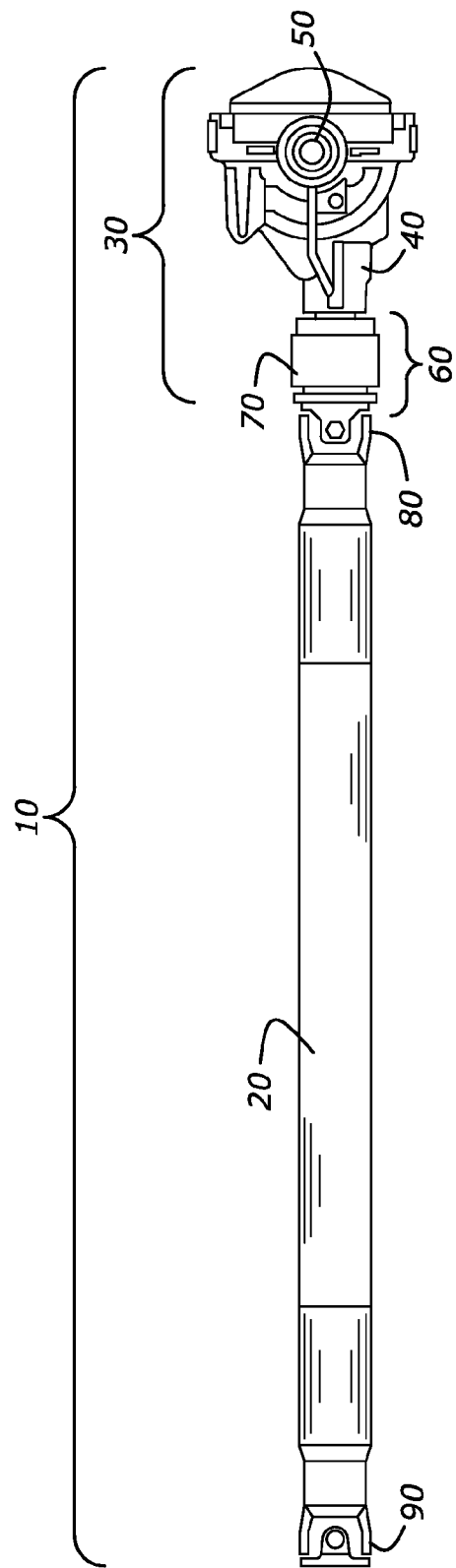
FIG. 1 is a side view of a vehicle propshaft and rear differential unit according to an exemplary embodiment of the present invention.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-5, wherein like characters represent the same or corresponding parts throughout the several views there are shown examples of vehicle differential units with torsional damper assemblies. The differential units are rear differential units incorporated in a vehicle driveline assembly. Differential units include multiple damper assemblies tuned to damp vibrations in different frequency levels. Each damper assembly includes an independently sprung mass. Damper assemblies, however, are still axially compact requiring minimal additional packaging space. In the illustrated embodiments, damper assemblies are positioned with respect to a clutch carrier unit and configured to dampen vibration at the clutch carrier.

Referring to the FIG. 1, there is shown therein a vehicle driveline assembly 10 according to an exemplary embodiment of the present disclosure. The driveline assembly 10 is configured for use in a rear-wheel drive or all-wheel drive vehicle. A propshaft 20 (or drive shaft) is connected to a rear differential unit 30 at one end. Rear differential unit (or "RDU") 30 includes a housing 40. A rear axle (not shown) can extend through an orifice 50 in the RDU housing 40. Connecting the propshaft 20 and the RDU 30 is a clutch carrier unit 60, as also discussed with respect to FIG. 2. Clutch carrier unit 60 includes a housing 70. Clutch carrier unit 60 is linked to propshaft 20 through a universal joint 80. Another universal joint 90 is included on propshaft 20 at the other end, where the propshaft can be linked to a transfer case or transmission (not shown).

Figure 2:
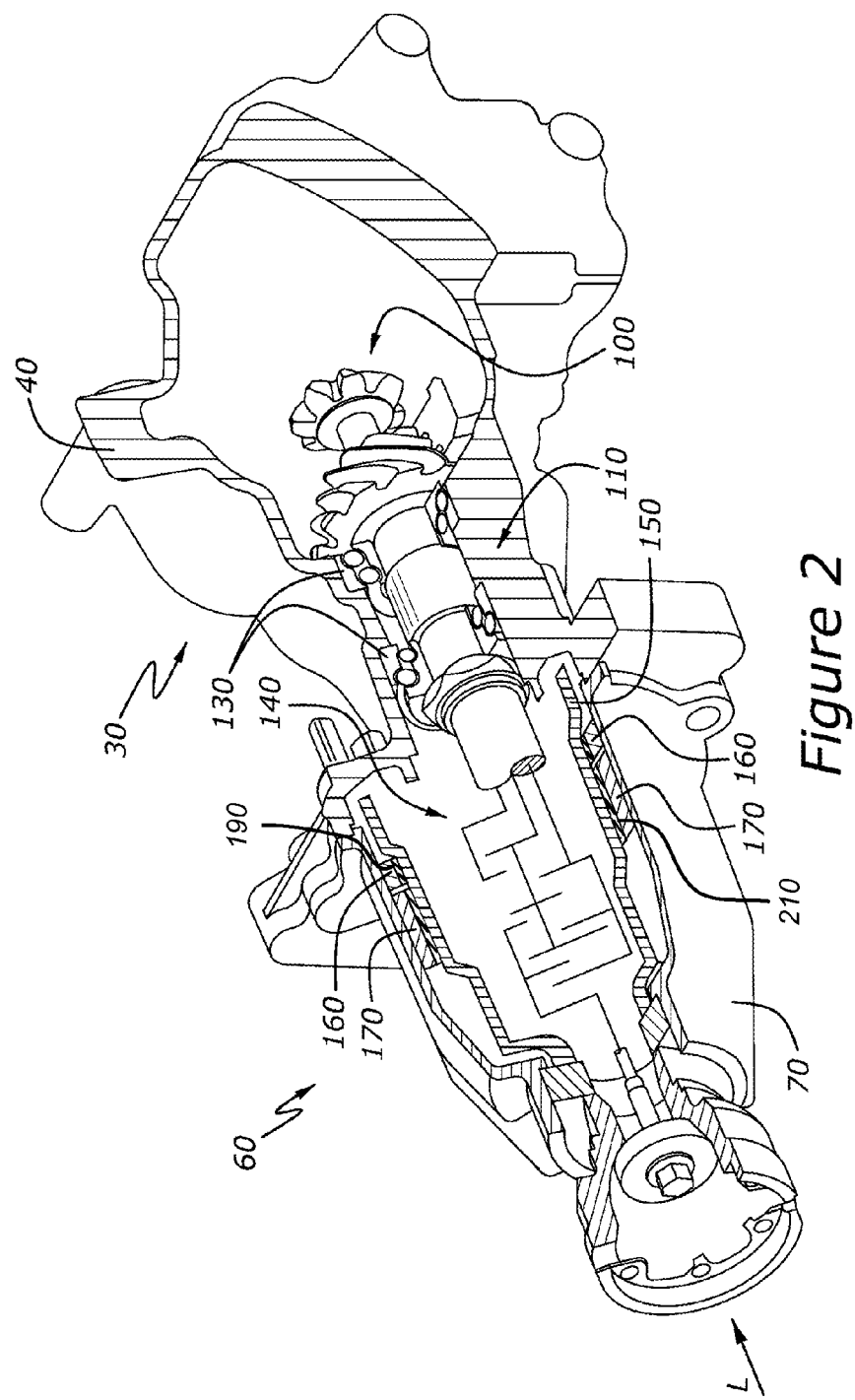
FIG. 2 is a perspective partial cut-away view of the propshaft and rear differential unit of FIG. 1 with high and low frequency dampers.

With respect to FIGS. 2 through 4, the RDU 30 of FIG. 1 is shown in more detail. FIG. 2 shows a partial cut-away perspective view of the RDU 30 with a pinion gear 100 and pinion bearing assembly 110. Pinion bearing assembly 110 engages a rack (or ring gear) 120, as shown in FIG. 3, at one end. Two tapered ball bearings 130 are included in pinion bearing assembly 110. The other end of pinion bearing assembly ties into a clutch pack 140, which is schematically shown. Clutch pack 140 is included in the clutch carrier unit 60. A hub 150 partially encloses the clutch pack 140. In this embodiment, two independently sprung masses 160, 170 are attached to hub 150. A damper assembly 180, as shown in FIG. 4, is positioned between clutch carrier housing 70 (of FIG. 2) and hub 150. Damper assembly 180 includes a sprung mass 160 by way of a damper ring. Between the damper ring 160 and hub 150 is an elastic ring 190 that acts as a spring between the damper and hub. Damper ring 160 is a relatively high frequency damper.

Another damper assembly 200 is positioned at a different axial location with respect to a longitudinal axis, L, of the RDU 30 than damper assembly 180, as shown in FIGS. 2-4. Damper assembly 200 is positioned between clutch carrier housing 70 and hub 150. Damper assembly 200 includes a sprung mass 170 by way of a damper ring. Between the damper ring 170 and hub 150 is an elastic ring 210 that acts as a spring element between the damper and hub. Damper ring 170 is a relatively low frequency damper.

Each damper assembly 180, 200 are a part of a torsional damper assembly 205, as shown in FIG. 4. Damper assemblies 180, 200 were tuned to have resonance at different frequencies. By having resonance at the predetermined frequencies damper assemblies 180, 200 are also configured to reduce noise or vibration at said frequencies. In this embodiment, damper assembly 180 was tuned to have resonance between 600 and 800 Hz, more particularly between 650 and 700 Hz, and more specifically at approximately 685 Hz. At this relatively high frequency, vehicle whine occurs without the damper assembly 180. A reduction of approximately 5-8 decibels in terms of the amplitude or peak omitting volume was measured with the use of damper assembly 180. Improvements in the translational acceleration responses in the range of 0-120 Hz were also measured. Damper assembly 200 was tuned to have resonance between 60 and 80 Hz, more particularly between 65 and 75 Hz, and more specifically at 70 Hz, a relatively low frequency. At 70 Hz, the vehicle demonstrated moan. With the implementation of damper assembly 200 a noise reduction of approximately 6 decibels was measured.

Damper assemblies 180, 200 are co-axially aligned with respect to hub 150, as shown in FIG. 4. Each damper ring 160, 170 is sized to a different length. Moment of inertia for ring 170 is 0.0064 Kg-m^2. Ring 170 is composed of steel and in the illustrated, tested embodiment weighed approximately 1.4 kilograms. The moment of inertia for ring 160 is 0.0066 Kg-m^2. Ring 160 is composed of aluminum and in the illustrated, tested embodiment weighed approximately 0.14 kilograms. Material selection and size (including, e.g., length) of each damper ring can be changed to tune the respective damper assemblies to cancel out a predetermined or target range of vibration. In the illustrated embodiment of FIGS. 2-4 an approximately 1:4 ratio of mass is used between the high frequency damper 160 and the low frequency damper 170.

Damper assemblies 180, 200 are internally mounted with respect to the clutch carrier unit 60. In this way, damper assemblies 180, 200 do not require any additional packaging space.

Figure 5:
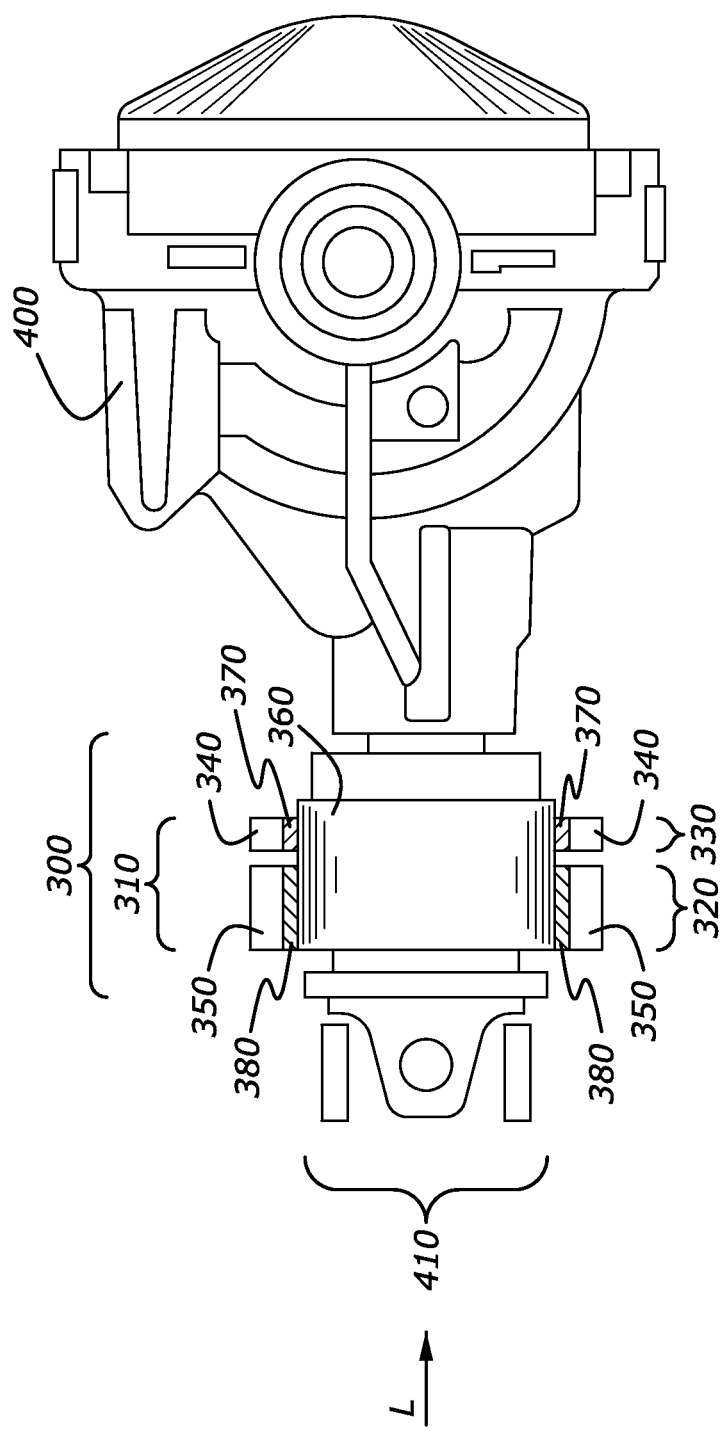
FIG. 5 is a perspective view of another exemplary embodiment of high and low frequency dampers from the rear differential unit of FIG. 2.

In another embodiment, e.g., as shown in FIG. 5, another exemplary clutch carrier unit 300 includes a torsional damper assembly 310 having two damper assemblies 320, 330. Clutch carrier unit 300 is linked to a differential unit 400 at one end and a universal joint 410 at another end. The torsional damper assembly 310 includes two sprung masses 340, 350 mounted on an exterior of a clutch carrier housing 360. Damper assembly 330 is positioned at a different axial location with respect to a longitudinal axis, L, of the clutch carrier unit 300 than damper assembly 320. Damper assembly 330 includes a sprung mass 340 by way of a damper ring. Between the damper ring 340 and clutch carrier unit housing 360 is an elastic ring 370 that acts as a spring between the damper mass 340 and clutch carrier unit housing 360. Damper ring 340 is a relatively high frequency damper. Damper assembly 330 is configured to have resonance at approximately 680 Hz.

Damper assembly 320 includes a sprung mass 350 by way of a damper ring. Between the damper ring 350 and clutch carrier unit housing 70 is an elastic ring 380 that acts as a spring between the damper ring 350 and clutch carrier unit housing 360. Damper assembly 320 is a relatively low frequency damper. Damper assembly 320 is configured to have resonance at approximately 70 Hz.

In the illustrated embodiments, forced vibrations separate or split the modes of vibration for the differential unit.

The illustrated elastic rings are composed of rubber. Other materials can be used. In one embodiment, a damper assembly includes the use of an elastic ring and another damper ring includes the use of a foam ring as a spring element. Damper rings can also be composed of the same or different materials. In one embodiment, damper rings are composed of steel. The steel ring is used to mitigate lower frequency vibrations or noises (e.g., vehicle moan). Damper rings can also be composed of aluminum, for example. Generally speaking, the aluminum ring is used to mitigate higher frequency vibrations or noises such as seat vibrations, gear rattle, or vehicle whine. In other embodiments, damper ring or spring element can be composed of aluminum alloys, rubber or hard plastics. In some examples, rubber is used for higher elasticity. In other examples steel is used for relatively lower elasticity. Different types of materials can be used.

The manufacture of the illustrated driveline assemblies can be readily ascertained by reviewing the disclosure above. One exemplary method of manufacturing a vehicle differential unit is also included herewith. The method includes the steps of: connecting a first damper assembly to the differential unit (e.g., 180 as shown in FIG. 4); and connecting a second damper assembly to the differential unit (e.g., 200). The first damper assembly is configured to dampen vibrations in a first frequency range. The second damper assembly is configured to dampen vibrations in a second frequency range.

In one embodiment, the method includes tuning the first damper assembly to dampen vibrations with in the first frequency range; and tuning the second damper assembly to dampen vibrations with in the second frequency range higher than the first range. Damper assemblies can be tuned, for example, by changing the dimensions of the damper ring(s), changing the dimensions of the spring element or changing the material composition of either. Damper assemblies can include, for example, a damper strip or non-annular mass as opposed to a ring.

In another embodiment the method includes, incorporating an elastic ring and a damper ring in the first or second damper assembly. Both damper assemblies 320, 330 shown, for example FIG. 5 included this feature. The method can also include, journaling the first or second damper assembly to an exterior of a differential unit housing (or clutch carrier unit housing 360, as shown in FIG. 5).

In the illustrated embodiments spring elements extend across the entire circumference of the clutch carrier hub or housing. The spring element however can be shorter than shown. In one embodiment, a rubber strip is issued in the place of a ring. Strip length (and other dimensions) can be tailored for cancellation of particular frequencies. The moments of inertias for each spring element, be it ring or strip for example, can be changed or remain constant.

Damper rings and spring elements can be formed known forming techniques, e.g., molding, lathing, stamping, hydroforming or extruding.

It will be apparent to those skilled in the art that various modifications and variations can be made to the methodologies of the present disclosure without departing from the scope its teachings. Those familiar with the art to which this disclosure relates will recognize various alternative designs and embodiments for practicing the invention within the scope of the appended claims.

We claim:

1. A vehicle differential unit (DU), comprising:
    a clutch carrier including a clutch pack, a hub mounted radially outward around the clutch pack, and a housing surrounding the hub;
    a torsional damper assembly having independently sprung first and second damper assemblies, each damper assembly configured to reduce vibration generated by the DU in separate predetermined frequency ranges, the first damper assembly mounted between the housing and the hub, and the second damper assembly mounted between the housing and the hub, spaced axially from the first damper assembly.

2. The differential unit of claim 1, wherein the first damper assembly includes an elastic ring contacting the hub and a damper ring attached to the elastic ring.

3. The differential unit of claim 2, wherein the second damper assembly includes a second elastic ring contacting the hub and a second damper ring attached to the second elastic ring.

4. The differential unit of claim 1, wherein the first damper assembly includes a cylindrical elastic ring mounted around the hub and a cylindrical damper ring attached to and radially outward of the elastic ring.

5. The differential unit of claim 4 wherein the second damper assembly includes a cylindrical second elastic ring mounted around the hub and a cylindrical second damper ring attached to and radially outward of the second elastic ring.

6. A vehicle driveline assembly, comprising:
    a propshaft;
    a differential;
    a clutch carrier, connecting the propshaft to the differential, including a clutch pack, a hub mounted radially outward around the clutch pack, and a housing surrounding the hub and secured to the differential;
    a first damper assembly mounted between the housing and the hub and including an elastic ring mounted to a damper ring, the first damper assembly configured to dampen vibrations in a first frequency range; and
    a second damper assembly mounted between the housing and the hub, spaced axially from the first damper assembly, and including a second elastic ring and a second damper ring mounted to the second elastic ring, the second damper assembly configured to dampen vibrations in a second frequency range different from the first frequency range.

7. The vehicle driveline assembly of claim 6, wherein the elastic ring is cylindrical and the damper ring is cylindrical and attached to the elastic ring.

8. The vehicle driveline assembly of claim 7, wherein the second elastic ring is cylindrical and the second damper ring is cylindrical and attached to the second elastic ring.

9. The vehicle driveline assembly of claim 6, wherein the first damper assembly is journaled onto the hub;
    wherein the second damper assembly is journaled onto the hub.

10. A method of manufacturing a vehicle differential unit, comprising:
    mounting a first damper to a radially outer surface of a clutch carrier hub;
    connecting a second damper, configured to damp different frequencies than the first damper, to the outer surface, axially spaced from the first damper;
    mounting the hub around a clutch pack;
    mounting a clutch carrier housing around the hub, the first and second dampers located between the housing and hub.

11. The method of claim 10, further comprising:
    tuning the first damper to dampen vibrations within a first frequency range; and
    tuning the second damper to dampen vibrations within a second frequency range higher than the first range.

12. The method of claim 10, further comprising:
    incorporating an elastic ring and a damper ring in the first or second damper.

13. The method of claim 10, further comprising:
    journaling the first or second damper to an exterior of the hub.

* * * * *